UNITED STATES PATENT OFFICE.

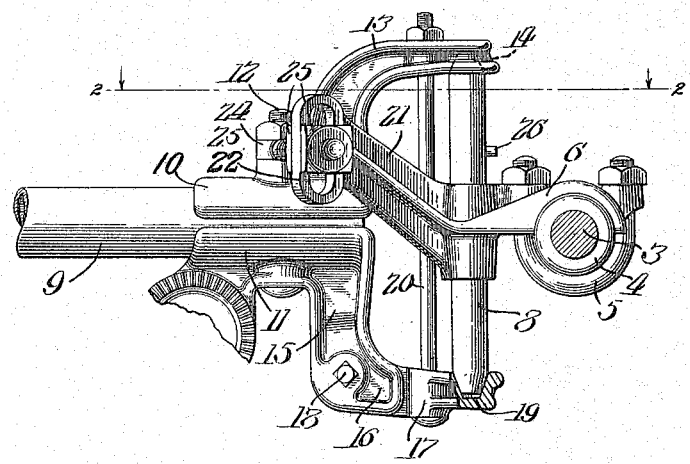

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

BEAM CONNECTION.

1,129,927.  Specification of Letters Patent.  Patented Mar. 2, 1915.

Application filed December 6, 1913. Serial No. 805,079.

*To all whom it may concern:*

Be it known that I, LEWIS E. WATERMAN, a citizen of the United States, residing at Rockford, in the county of Winnebago and the State of Illinois, have invented certain new and useful Improvements in Beam Connections, of which the following is a specification.

This invention relates to the supporting connection of beams for carrying earth agitating devices, more particularly to beams adapted for use with cultivators.

The object of my invention lies in certain novel structural features in beam connections of the above character, to enable various adjustments of the beam to be made relative to its supporting means and to allow the beam to be readily and easily detached from said means.

In the accompanying drawings: Figure 1 is a side elevational view of the beam with my improved connection therefor to a frame member. Fig. 2 is a plan sectional view of the beam connection as taken on the line 2—2 of Fig. 1.

The supporting means to which the beam is connected is in the present case illustrated as a rod 3, which represents the usual arch or bail to which cultivator beams are usually attached. Upon this rod is journaled loosely a sleeve 4 to which is fixedly secured by the U-bolt 5 a bracket 6 having formed therewith a vertically disposed apertured mounting 7 to receive a rod or post 8 movable lengthwise thereof; this form of bracket being used with a cultivator to allow a beam connected to rod 8 to be vertically pivotal from rod 3. The beam 9 is connected to the post 8 by a yoke connection, the arms of the yoke engaging ends of said post, and the yoke is constructed as follows: It is formed of an upper and lower section 10 and 11 respectively, fitting on opposite sides of beam 9 and being attached fixedly thereto by a bolt 12 passing through the said sections and the beam. The upper section has formed therewith an arm 13 which forms one arm of the yoke and the end of this arm has a socket 14 to receive the top end of post 8. The lower section has formed therewith a depending arm 15 which terminates in a bifurcated end 16, said end receiving between its sides an arm 17 which forms with arm 15 the opposite arm of the beam yoke above mentioned, and said arm 17 is bolted at 18 to arm 16 in a manner to be freely pivotal therefrom, the outer end of arm 17 having a socket 19 for the reception of the lower end of the post. A bolt 20 connects arms 13 and 17, thereby drawing the pivoted arm 17 tight upon the post and effecting a rigid connection between the arms 13 and 17.

The bracket 6 is formed with an arm 21 extending substantially radially from its support on post 8 and the end of this arm is formed with a head having a vertically elongated opening 22 therethrough, said head being such a distance from post 8 that a bolt 23 having a head 24 pivoted to bolt 12 under the lock-nut thereof, lies in a plane tangential to an arc struck from the post center. The head 24 of bolt 23 having flat sides will be held at right angles to beam 9 by the tightening of the nut for said bolt, and the threaded end of bolt 23 is located in the opening 22 and has nuts 25, one on each side of the head of arm 21 to lock said bolt fixedly with said arm.

The beam connected in the above manner is maintained fixed in relation to the post both against vertical movement by reason of the rigidly maintained yoke connection and from lateral movement by the arm 21 and bolt 23 connection, in other words, the beam and post are, during operation, as one integral member; but since the post is carried by a bracket pivotally mounted, the beam will be vertically movable in a pivotal manner from the supporting rod 3; this manner of support being used in cultivators.

When it is desirous of adjusting the operative position of the beam vertically relative to its support for the purpose of varying the suction of shovels carried by the beam or for varying the position of the beam relative to parts of the implement mechanism, the nuts 25 would be loosened, thus allowing the beam with its yoke connection to be moved vertically to suit the requirements, the post 8 sliding freely in its mounting 7, and when this adjustment is made the set-bolt 27 is tightened to lock said post from movement. To obtain different lateral positions of the beam relative to its support 3, the nuts 25 would be adjusted to move the bolt 23 and swing the beam on its pivot to such lateral position as is desired; and it will be observed that this lateral support, arm 21 and bolt 23, braces the beam to maintain it from lateral movement in a manner such that the lateral strains of the beam are taken directly by said members without the loss of unnecessary leverages.

Mounting and dismounting of the beam is very easily effected, for by removing the outer nut 25 the beam will be freed of lateral connection and by removing the nut of bolt 20 the lower arm 17 of the beam yoke will swing clear of post 8, (leaving the beam suspended from the upper post end) and allow the beam and yoke to be raised to withdraw the upper arm 13 from its engagement with the upper end of the post, thus entirely disconnecting the beam from the support; and it will be noticed that should the set-screw 27 become loosened the post will be maintained in position by the stud 26 which will stop said post from sliding through its mounting.

I claim as my invention:

1. In a beam connection, the combination of beam-supporting means, a beam pivotally mounted thereon on a vertical axis, an arm extending rigidly from the supporting means to one side of the beam, and an adjustable connection between said arm and the beam for holding the beam from swinging laterally on its vertical axis and for swinging the beam laterally on said axis to differently adjusted positions.

2. In a beam-connection, the combination of a beam-supporting means, a beam pivotally mounted thereon on a vertical axis and being vertically adjustable at said mounting, an arm extending rigidly from the supporting means to one side of the beam, an adjustable connection between said arm and the beam for holding the beam from swinging laterally on its vertical axis and for swinging the beam laterally from said axis to differently adjusted positions, and means for permitting the said connection to be moved vertically when the beam is adjusted vertically at its pivotal mounting.

3. In a beam-connection, the combination of beam-supporting means, a beam pivotally mounted thereon on a vertical axis, an arm extending rigidly from said supporting means and terminating at its rear end to one side of said vertical axis, an adjustable connection between said end of the arm and the beam for adjusting the beam about its vertical axis.

4. The combination of beam-supporting means, a beam having a yoke connection therewith, the yoke adapted to be moved vertically at its said connection, and a rigid connection between the supporting means and beam for holding the beam against lateral movement with respect to the supporting means, said connection being movable vertically to accommodate said vertical movement of the yoke.

5. The combination with a beam support, of a beam pivotally mounted thereon on a vertical axis, and a rigid connection between the beam and beam support for holding the beam from horizontal movement on its said pivot, including a member disposed substantially in a horizontal plane common with the arc of a circle struck therein from said pivot of the beam.

6. The combination with a beam support, of a beam pivotally mounted thereon on a vertical axis, and a connection between the beam and beam support for holding the beam from horizontal movement on its said pivot, including a member disposed substantially in a horizontal plane common with the arc of a circle struck therein from said pivot of the beam, said member being adjustable lengthwise for varying the horizontal position of the beam.

7. The combination with a bracket pivoted on a horizontal axis to a beam support, of a beam attached to the bracket pivoted on a vertical axis, and a brace connection between the bracket and beam to hold the beam from pivotal movement on its vertical axis, said connection including an adjustment to vary the position of the beam movable on its said vertical axis.

8. A beam mounted pivotally on a horizontal axis and having a joint to allow it lateral movement relative to said axis, and adjustable means connected to the beam for holding the beam fixed against lateral movement but being adjustable to move the beam laterally to different fixed positions.

9. The combination with beam-supporting means, of a beam pivoted thereto on a vertical axis, and a brace member pivoted to the beam on a vertical axis and being connected to the beam supporting means in a vertically adjustable manner.

10. In a beam connection, the combination of a beam-supporting means, a beam pivotally mounted on a vertical axis, and means extending rigidly from said supporting means and connecting to the beam, said means being adjustable to move the beam on its axis to different fixed positions.

In testimony whereof I have hereunto set my hand in presence of two subscribing witnesses.

LEWIS E. WATERMAN.

Witnesses:
JOHN F. McCANNA, Jr.,
A. O. BEHEL.